(12) United States Patent
Pan

(10) Patent No.: US 8,956,035 B2
(45) Date of Patent: Feb. 17, 2015

(54) LIGHT GUIDE PLATE WITH MICRO PRISMS, MANUFACTURE METHODE THEREOF AND PLATE SHAPE LAMP AND PLATE-SHAPE LAMP FIXTURE MADE THEREBY

(76) Inventor: Dingguo Pan, Shanghai (CN)

( * ) Notice: Subject to any disclaimer, the term of this patent is extended or adjusted under 35 U.S.C. 154(b) by 166 days.

(21) Appl. No.: 13/695,350

(22) PCT Filed: Apr. 30, 2010

(86) PCT No.: PCT/CN2010/072352
§ 371 (c)(1),
(2), (4) Date: Oct. 30, 2012

(87) PCT Pub. No.: WO2011/134164
PCT Pub. Date: Nov. 3, 2011

(65) Prior Publication Data
US 2013/0044513 A1  Feb. 21, 2013

(51) Int. Cl.
*F21V 8/00* (2006.01)
*F21V 13/12* (2006.01)
*F21V 13/02* (2006.01)
*B29D 11/00* (2006.01)
*G02B 5/04* (2006.01)
*F21S 8/00* (2006.01)
(Continued)

(52) U.S. Cl.
CPC .............. *G02B 5/045* (2013.01); *F21S 8/033* (2013.01); *G02B 6/0038* (2013.01); *G02B 6/0046* (2013.01); *F21V 29/2206* (2013.01); *F21V 29/225* (2013.01); *F21V 29/246* (2013.01); *F21Y 2101/02* (2013.01); *F21Y 2105/00* (2013.01)
USPC .............................. 362/607; 362/606; 264/1.1

(58) Field of Classification Search
None
See application file for complete search history.

(56) References Cited

U.S. PATENT DOCUMENTS 6,435,687 B1    8/2002  Fukiharu
2007/0025121 A1*  2/2007  Harada et al. ................. 362/607
(Continued)

FOREIGN PATENT DOCUMENTS

EP     0364228    4/1990
EP     0766037    4/1997
(Continued)

OTHER PUBLICATIONS

International Search Report for international application No. PCT/CN2010/072352, dated Jan. 20, 2011 (5 pages).

*Primary Examiner* — Ashok Patel
(74) *Attorney, Agent, or Firm* — Hamre, Schumann, Mueller & Larson, P.C.

(57) ABSTRACT

A light guide plate with triangular micro prisms comprises a smooth surface and a prism surface. A plurality of micro prism bodies is arranged on the prism surface. The cross section of each prism body is a triangle. A light source is provided on the outside of the micro prism having the longest distance from the triangle vertex to the smooth surface. The side of the triangle which is far from the light source and receives the light from the light source is called the acceptance side. The angle between the acceptance side and the normal line of the smooth surface is 40 degree to 90 degree. The angles from the micro prism body having the shortest distance between the vertex of triangle and the smooth surface to the micro prism body having the longest distance between the vertex of triangle and the smooth surface are gradually increased. The light guide plate may be symmetrical or asymmetrical, and it may be a rectangular plate or a circular plate. The manufacture method of the light guide plate, a plate-shape lamp and a plate-shape lamp fixture including the light guide plate are also disclosed.

18 Claims, 12 Drawing Sheets

(51) Int. Cl.
*F21V 29/00* (2006.01)
*F21Y 101/02* (2006.01)
*F21Y 105/00* (2006.01)

(56) References Cited

U.S. PATENT DOCUMENTS

2008/0186739 A1 8/2008 Chen et al.
2009/0040787 A1 2/2009 Nagata et al.
2009/0185109 A1* 7/2009 Yoon et al. .................. 349/65
2010/0014317 A1* 1/2010 Liao ............................ 362/619

FOREIGN PATENT DOCUMENTS

| JP | 2006-073498 | 3/2006 |
| WO | 2010/022539 | 3/2010 |
| WO | 2010/022540 | 3/2010 |

* cited by examiner

LIGHT GUIDE PLATE WITH MICRO PRISMS, MANUFACTURE METHODE THEREOF AND PLATE SHAPE LAMP AND PLATE-SHAPE LAMP FIXTURE MADE THEREBY

TECHNICAL FIELD

This invention relates generally to a light guide plate with micro prisms, especially to a light guide plate with triangular prisms having variable angle critical edges and the manufacturer method thereof, and the various plate-shape lamps and plate-shape lamp fixtures made therefrom.

BACKGROUND ART

In the PCT international application PCT/CN2008/001535 filed on Aug. 26, 2008, the applicant invented a light guide plate with triangular prisms having identical cross sections, and the plate-shape lamps and plate-shape lamp fixtures made therefrom. The application is incorporated herein, by reference, in full.

FIG. 1 shows a symmetrically arranged light guide plate with triangular micro prisms having identical cross sections, wherein a plurality of parallel strip-like micro prism bodies are arranged on the left and right sides starting from the symmetrical center plane 00' on one surface of the prism surface 11 of the light guide plate 1 and the cross section of each micro prism body 111 is triangular, wherein the said triangles are continuously arranged in zigzag form having identical shape of cross sections. The vertical distance p from the vertex of the left and the right triangles adjacent to the symmetrical center plane to the smooth surface 12 of the light guide plate is the shortest and is gradually increased towards the left and right sides and the distance of the vertex of each triangle is equal in horizontal direction, δ, respectively. Therefore, the length of the entire triangular prism body is δ×2n, wherein, n represents the numbers of the triangular prism bodies on the side of the symmetrical center plane. In addition, the vertexes of the triangles close to the smooth surface 12 can be connected, as is the case with those far from the smooth surface 12, thus obtaining two planes formed by two straight lines or connection lines, wherein the two straight lines or two planes are inclined but parallel to each other. The two straight lines interest with the central lines of the cross section of the light guide plate at Point A and H, respectively, i.e. AN and HM, which forms the inclusion angle α with the smooth surface 12 of the light guide plate, and a is less than 45 degrees, preferably, less than 10 degrees.

FIGS. 2a and 2b shows a plate-shape lamp, comprising light guide plate 1 and a plurality of lamp bodies 2, wherein light guide plate 1 is equipped with strip-like flanges arranged on the two outermost triangular prism bodies on the two sides of the center plane so as to form lamp groves 14 and 14' accommodating a plurality of lamp bodies 2. Lamp body 2 is a light assembly comprising LED, light bulb and electrode tube or a plurality of prefabricated LEDs. Preferably, lamp body 2 is a prefabricated strip-like light assembly comprising a plurality of SMD LEDs 21 and circuit board 22, which is directly mounted inside the lamp groove 14 and 14' to make the emitting plane of the SMD LED 1 inside the lamp groove closely attached to the inside wall of the lamp groove and to intersect with the surface formed by connecting the vertexes of the triangles on all cross sections at an inclusion angle of 90-α so that the light from SMD LED 21 can shine from both ends of the light guide plate, respectively, on the prism bodies with right angled triangles having identical cross sections on either side bordered with the center plane. The said LED and SMD LED are low power tubes and a plurality of chips can be arranged in an SMD LED.

The said plate-shape lamp can alternatively comprise an edge frame 3 and a reflective lining 50, wherein the edge frame 3 can comprise heat dissipating strip 31 and an upper and a lower end plate, which are connected to form a rectangular frame. The two heat dissipating strips 31 are made of heat dissipating metals, such as aluminum alloy and copper alloy, and the two end plates 32 are made of plexiglass and transparent plastics of polycarbonate or poly methyl acrylic lipid. Reflective lining 5 is a blank sheet, mounted over the light guide plate 1. The reflective lining 5 can be made of plastics, paper or metal materials, such as aluminum alloy and copper alloy. In addition, plate-shape lamp can also comprise two terminals 29.

FIG. 3 shows the plate-shape lamp fixture made of plate-sheet lamp, which can further comprise a bottom frame 4 and a constant current source 7. The bottom frame 4 is a rectangular frame made of metal materials. The constant current source 7 of the lamp body 2 is mounted on the bottom frame 4 via connections, the output end of which is connected with terminal 29 via a conductor and the input end is connected with the power supply via power jack.

FIGS. 4 and 6 show the asymmetrically arranged light guide plate with triangular oriented prisms having identical cross sections, the plate-shape lamp and the plate-shape lamp fixture, respectively, the actual structures of which are similar to those of the symmetrically arranged light guide plate with triangular oriented prisms having identical cross sections, the plate-shape lamp and the plate-shape lamp fixture as shown in FIGS. 1-3. Therefore, the descriptions thereof are omitted herein.

In the PCT international application PCT/CN2008/001534 filed on Aug. 26, 2008, the applicant invented an oriented circular light guide plate with triangular prisms having identical cross sections, and the circular plate lamps and circular plate lamp fixtures made therefrom. The application is incorporated herein, by reference, in full.

FIG. 7-9 show the oriented circular light guide plate with triangular prisms having identical cross section, circular plate lamps and circular plate lamp fixtures made therefrom, the actual structure of which is similar to that of the oriented light guide plate with triangular prisms having identical cross sections, plate shape lamps and plate shape lamp fixture made therefrom as shown in FIG. 1-3 and is hereby omitted for its detailed description.

In a further study, the applicant find the brightness of the emitted light is satisfactory, but with somewhat poor uniformity for the light guide plate and the plate shape lamps and plate shape lamp fixture made therefrom of the said structure. Therefore, further improvement thereof is required.

SUMMARY OF THE INVENTION

This invention aims to provide a light guide plate with triangular micro prisms and the manufacture method thereof, and the plate shape lamp and plate shape lamp fixtures made therefrom, featuring very satisfactory brightness and uniformity of the emitted light.

For this reason, this invention provides an asymmetrically arranged light guide plate with triangular micro prisms, comprising the smooth surface and prism surface, wherein a plurality of parallel strip-like micro prism bodies are arranged on the said prism surface, the cross section of each micro prism body is triangular, the distance of the vertexes of all triangles from left to right or from right to left to the said smooth surface is gradually increased and the connection line of the vertexes thereof is a straight line, and the said straight line forms an inclusion angle $\alpha$ less than 45 degrees with the said smooth surface. A belt-shape light source is arranged on the micro prism body where the vertex of the triangle is the outermost from the said smooth surface. The sectional triangles of the micro prism bodies are far from the belt-shape light source and the side receiving the light emitted from the said belt shape light source is called critical acceptance edge. The said critical acceptance edge forms a critical angle ranging from 40 degrees to 90 degrees with the normal line of the said smooth surface. The said critical angle is gradually increased from the micro prism body where the vertex of the triangle is nearest to the said smooth surface to the micro prism body where the vertex of the triangle is farthest to the said smooth surface.

This invention further provides a symmetrically arranged light guide plate with triangular micro prisms, comprising the smooth surface and the prism surface, wherein a plurality of parallel strip-like micro prism bodies are symmetrically arranged on the said prism surface, having triangular cross section for each said micro prism body, the distance from the vertexes of the triangles on the left and right sides of the symmetrical center to the said smooth surface is increased gradually, the connection line of the vertexes of the triangles is a straight line. The said straight line forms inclusion angles all less than 45 degrees with the said smooth surface. Two belt shape light sources are arranged on the two micro prism bodies where the vertex of the triangle is the farthest from the said smooth surface. The side of the sectional triangle for each micro prism body far away from the said belt shape light source and receiving the light emitted from the belt shape light source is called critical acceptance edge. The said critical acceptance edge forms a critical angle with the normal line of the said smooth surface, ranging from 40 degrees to 90 degrees and gradually increased from the symmetrical center to the left and right sides of the said micro prism body.

This invention further provides a circular light guide plate with triangular micro prisms, comprising the smooth surface and the prism surface, wherein a plurality of concentric ring-shaped micro prism bodies are arranged in the radial direction starting from the central axle of the said prism surface. The cross section of each ring shaped micro prism body via the central axle is triangular. The distance from the vertexes of the sectional triangle of the ring shaped micro prism body arranged on the left and right sides toward the central axle to the smooth surface is gradually increased. The radial connection lines of the vertexes of the sectional triangles of each ring shaped micro prism body are two inclined straight lines. The said straight line forms an inclusion angle $\alpha$ less than 45 degree with the said smooth surface. A circular belt-shape light source is arranged on the micro prism body where the vertex of the triangle is the outermost from the said smooth surface. The side of the sectional triangle of each ring shaped micro prism body being far away from the said belt shaped light source and receiving the light emitted from the said belt shape light source is called critical acceptance edge. The said critical acceptance edge forms a critical angle ranging from 40 degrees to 90 degrees with the normal line of the said smooth surface. The said critical angle is gradually increased from the central axle to the left and right sides of the said circular micro prism body.

For the said light guide plate, another side relative to the critical acceptance edge of the sectional triangle of each micro prism body forms an inclusion angle with the normal line of the said smooth surface, ranging from 0 degree to 40 degrees.

For the said light guide plate, another side relative to the critical acceptance edge of the sectional triangle of each micro prism body forms an inclusion angle of 0 degree with the said smooth surface.

For the said light guide plate, the said prism surface has n prisms, wherein the said n prisms are divided into m groups. The said critical angle of the said micro prism body is gradually increased by steps, wherein m is greater than or equal to 3.

For the said light guide plate, the said straight line forms an inclusion angle $\alpha$ less than 10 degrees with the said smooth surface.

For the said light guide plate, strip-like flanges are arranged on the micro prism body where the vertex of the triangle is farthest from the smooth surface so as to accommodate the lamp groove of the said belt shaped light source.

For the said light guide plate, the distances of all the sectional triangles are equal in the lengthwise direction and the said lengthwise direction is parallel to the said smooth surface.

The said light guide plate is made of transparent plastics of polycarbonate or polyethylene methyl acrylic lipid.

This invention further provides a plate-shape lamp, comprising the said light guide plate, wherein strip-like flanges are arranged on the micro prism bodies where the vertex of the triangle is farthest to the smooth surface so as to form the lamp groove accommodating the said belt shape light source and the belt shape light source mounted therein.

For the said plate-shape lamp, the said belt shape light source is a prefabricated strip-like lamp assembly comprising a plurality of SMD LEDs and circuit boards. The emitting plane of the said belt shape light source keeps close to the internal wall of the said lamp groove and parallel to the smooth surface of the said light guide plate.

For the said plate-shape lamp, the LED among the said SMD LEDs is low power tube and a plurality of LEDs can be arranged in one SMD LED.

The said plate-shape lamp further comprises heat dissipating strips, which are installed in the same lamp groove of the said belt shape light source to fasten the said belt shape light source and absorb the heat emitted from the said belt shape light source.

The said plate-shape lamp further comprises a reflective lining mounted on the said light guide plate and the reflective plane of the said reflective lining stands opposite to the prism surface of the said light guide plate.

For the said plate-shape lamp, the said reflective lining is made of plastics, paper or metal materials.

This invention further provides a lighting fixture, comprising the said plate-shape lamp, the bottom frame accommodating the said plate-shape lamp and the constant current source of the belt-shape light source. The constant current source of the said belt shape light source is mounted on the bottom frame, the output terminal of which is connected with the said belt shape light source via conductors.

This invention further provides a method manufacturing the said light guide plate with micro prisms, comprising: pouring the pre-polymerized slurry containing methyl methacrylate into the laminates of the prism mold having shapes corresponding to a plurality of light guide plates with micro prisms, polymerizing the methyl methacrylate slurry into polymethyl methacrylate sheet, opening the laminate of the mold and removing the polymethyl methacrylate sheet, and cutting it to form micro prisms at predetermined size.

This invention is conceived to provide a light guide plate with triangular micro prisms having satisfactory brightness and uniformity of emitting light. The late-shape lamp and plate-shape lamp fixture made therefrom is of thin wall and thus, the plate-shape lamp fixture can be embedded into the wall and arranged on the same plane with the wall. This thin-wall plate-shape lamp fixture can be extensively used for kitchen wall, closet inner wall, upper part of the closet mirror, stairs and staircase, public corridor, wall ads lighting and factory streamline. In another aspect, the plate-shape lamp of the plate-shape lamp fixture features limited power consumption, available for similar brightness with the common light bulb even when its power is 1/10 of the common light bulb, but with limited heat dissipating capacity and long service life, which can expand and facilitate people's life, work and learning, while achieving high efficiency and energy conservation, as well as simple structure and easy use.

BRIEF DESCRIPTIONS OF THE DRAWINGS

DETAILED DESCRIPTION OF THE PREFERRED EMBODIMENTS

For the convenience of description, the applicant introduces the concept of critical acceptance edge herein. Among the said light guide plate, plate-shape lamp and plate-shape lamp fixture, the side of the sectional triangles of the micro prism body staying far from the lamp body and facing towards the irradiation direction is called critical acceptance edge. The extension line of the said critical acceptance edge forms a critical angle with the normal line of the smooth surface, ranging from 40 to 90 degrees.

Light Guide Plate with Triangular Micro Prism Having Variable Angle Critical Edge FIGS. 1 to 9 shows the light guide late with triangular micro prisms having equal cross section. After further study, the applicant finds the brightness of the light emitted from the light guide late with triangular micro prisms having equal cross section, the plate-shape lamp and the plate-shape lamp fixture made therefrom is very satisfactory, but with somewhat poor uniformity.

To address the foregoing technical issues, this invention provides a light guide plate with triangular micro prisms having variable angle critical edges to replace the light guide late with triangular micro prisms having equal cross section. That is, the angle of the critical acceptance edge of each micro prism of the light guide plate is designed to be gradually variable within certain range so as to ensure uniform distribution of the emitted light.

Figure 1:
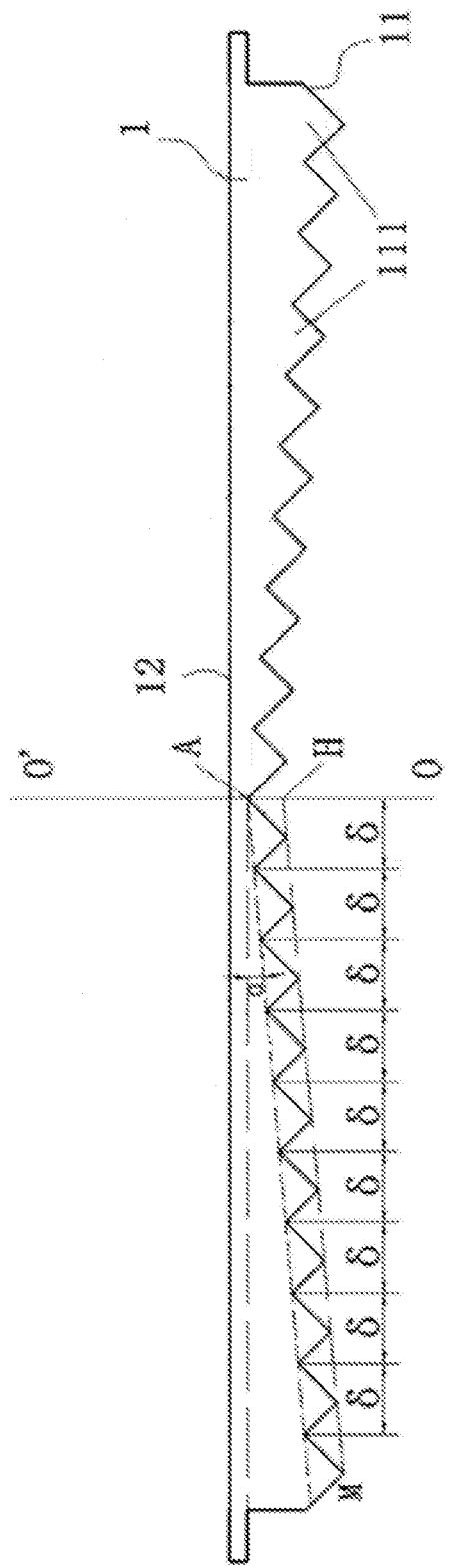
FIG. 1 is a sectional view of the symmetrically arranged light guide late with triangular prisms having equal cross section.
Figure 2A:
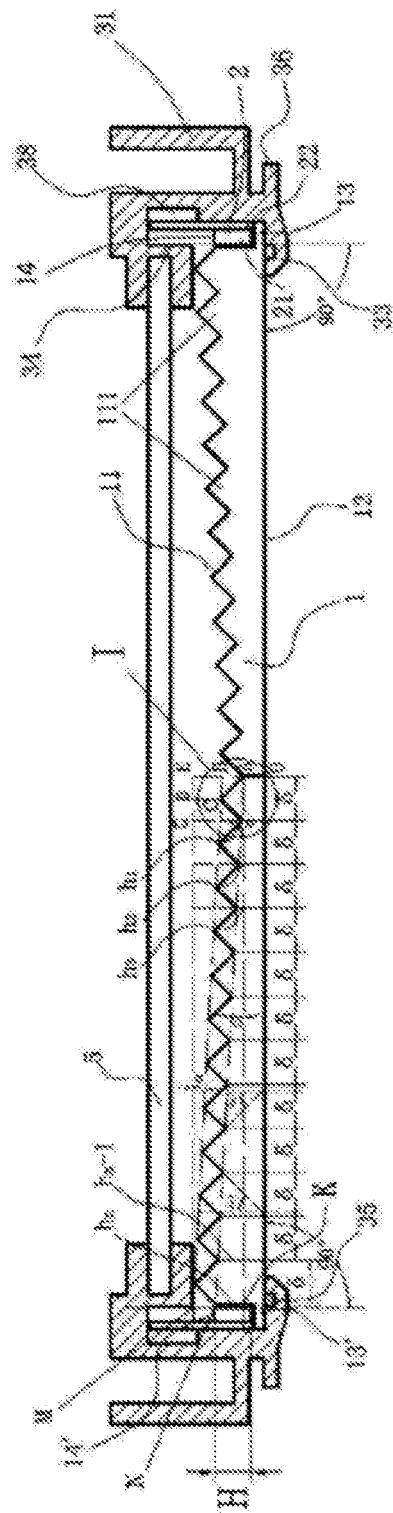
FIGS. 2a and 2b are the sectional view and the top view of the plate-shape lamp made of the light guide plate of FIG. 1, respectively.
Figure 2B:
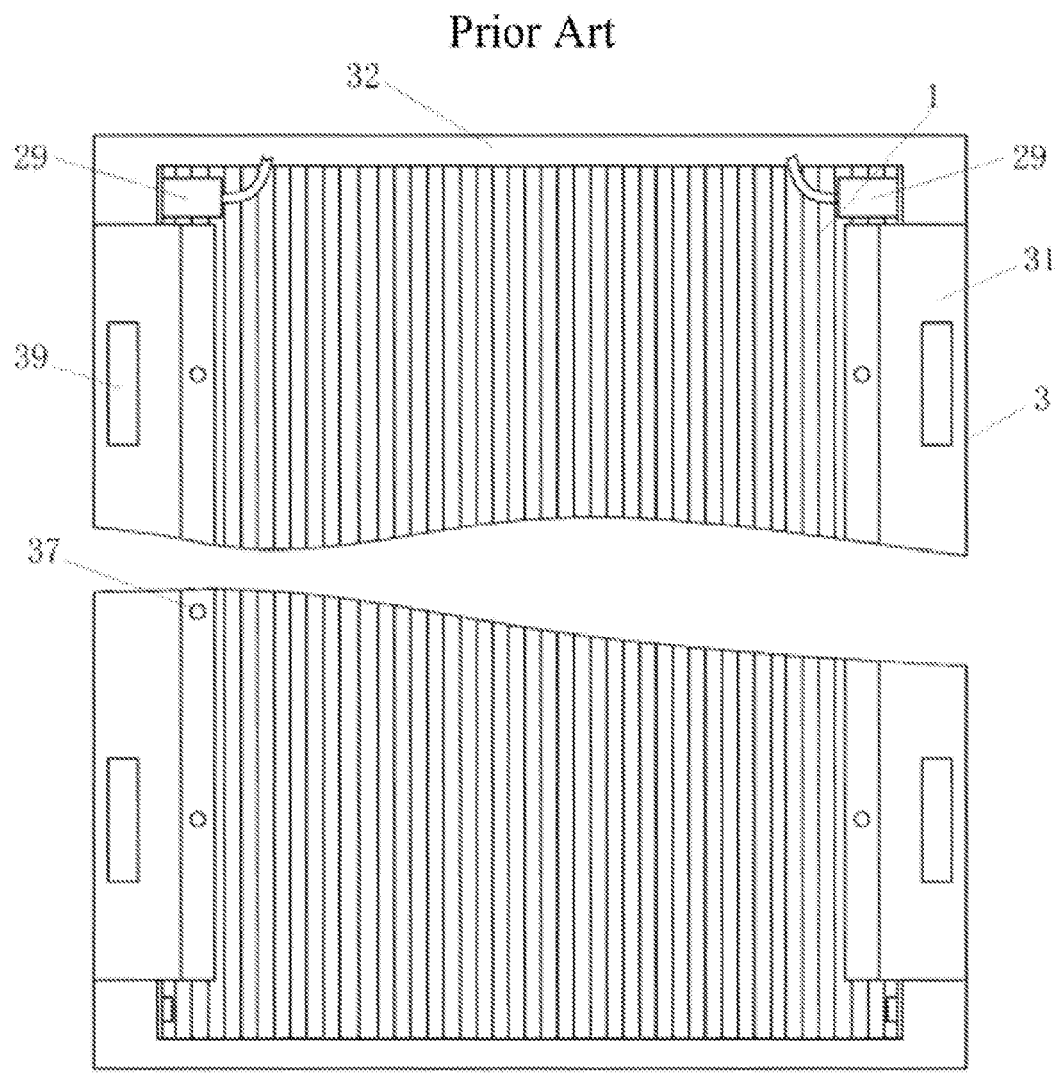
Figure 3:
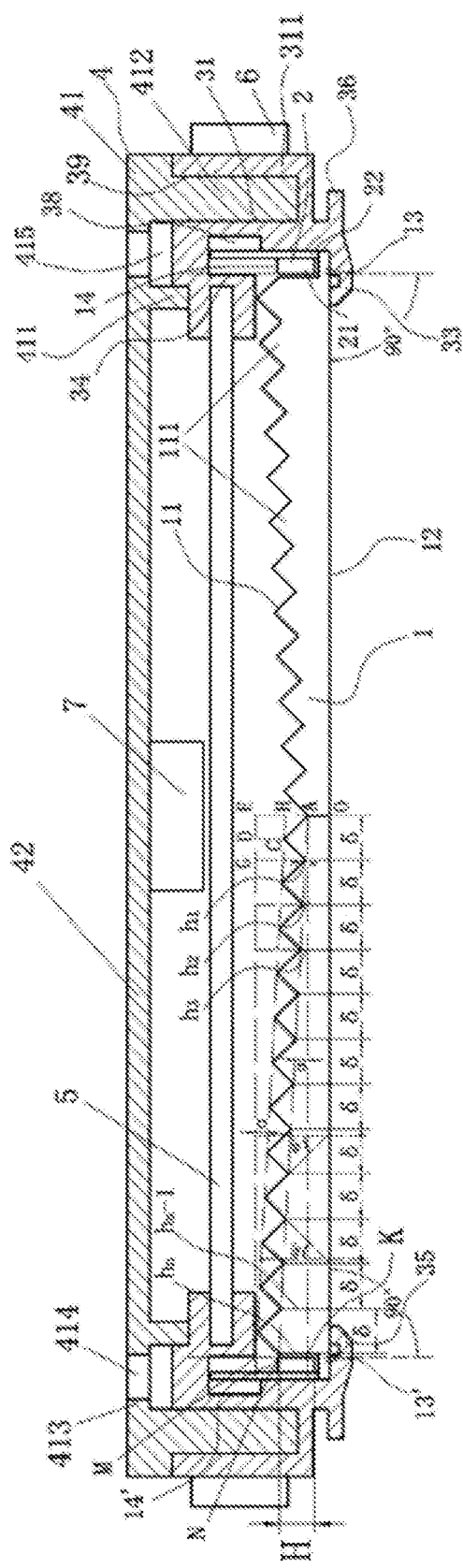
FIG. 3 is the sectional view of the plate-shape lamp fixture made of the plate-shape lamp of FIG. 2.
Figure 4:
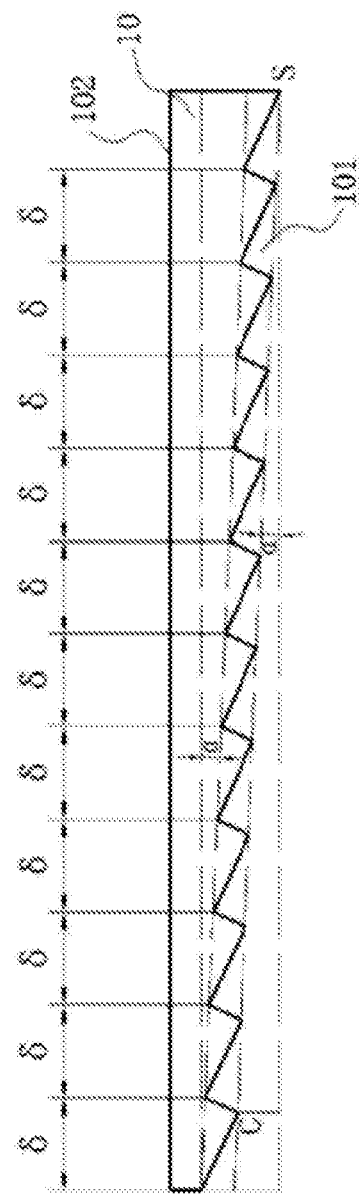
FIG. 4 is the sectional view of the asymmetrically arranged light guide plate with triangular prisms having equal cross sections.
Figure 5:
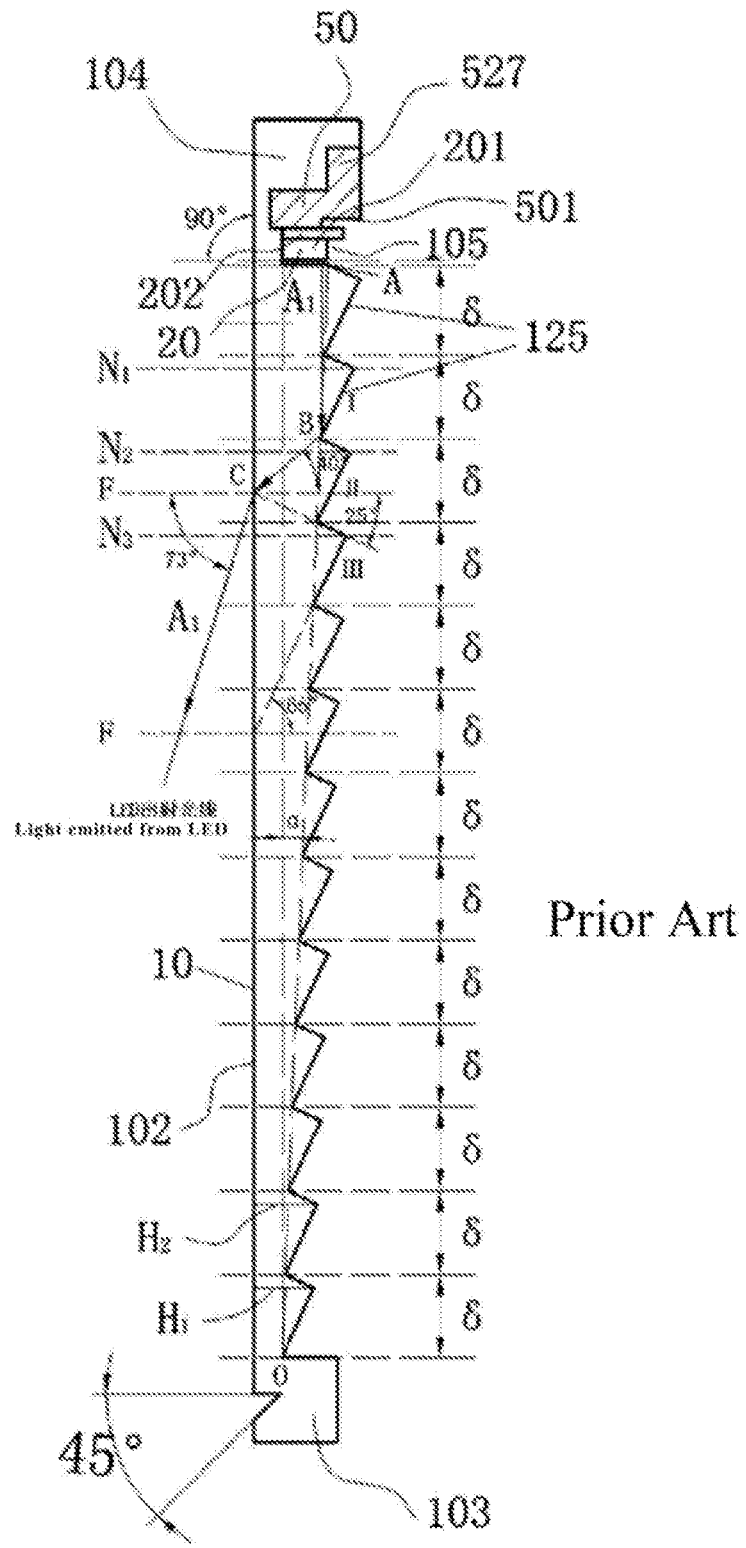
FIG. 5 is the sectional view of the plate-shape lamp made of the light guide plate of FIG. 4.
Figure 6:
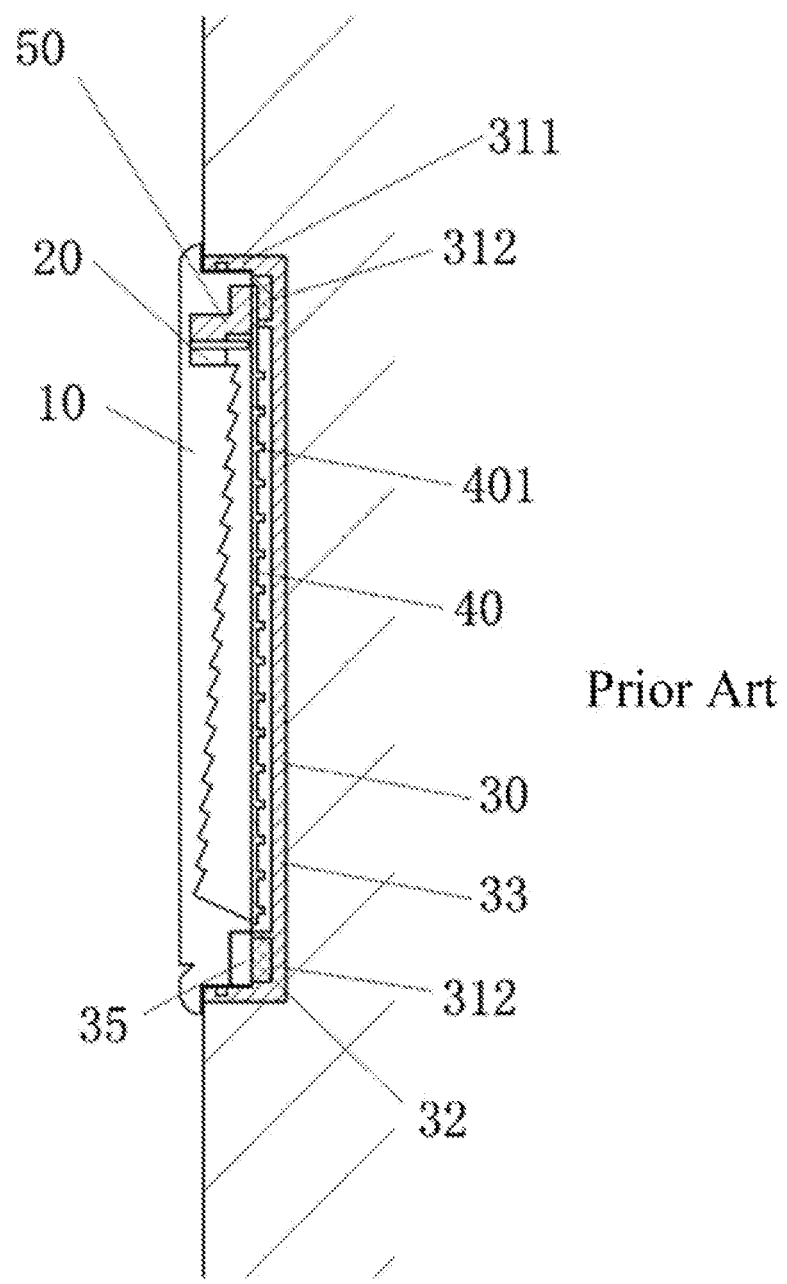
FIG. 6 is the sectional view of the plate-shape lamp fixture made of the plate-shape lamp of FIG. 5.
Figure 7:
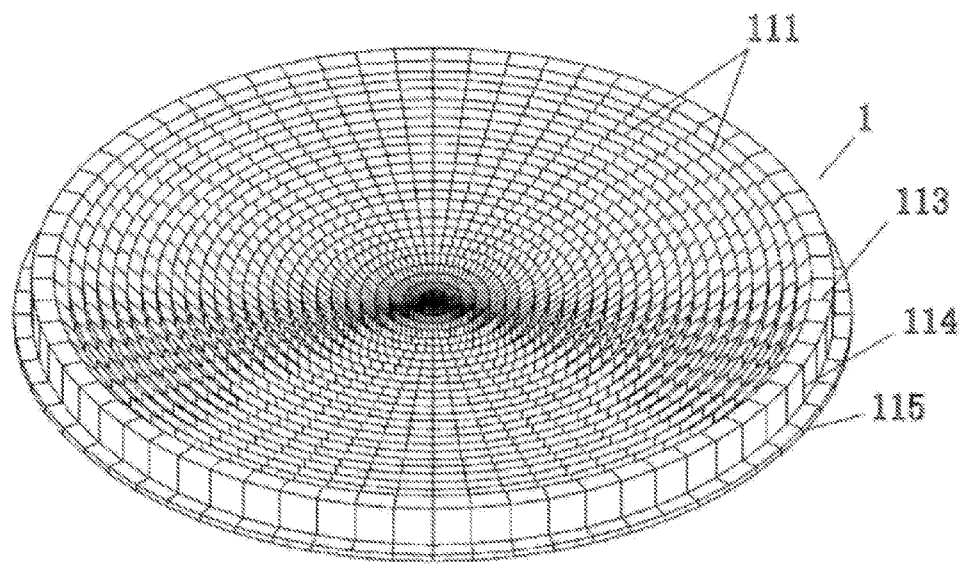
FIG. 7 is the 3D view of the circular light guide plate with triangular prisms having equal cross section.
Figure 8:
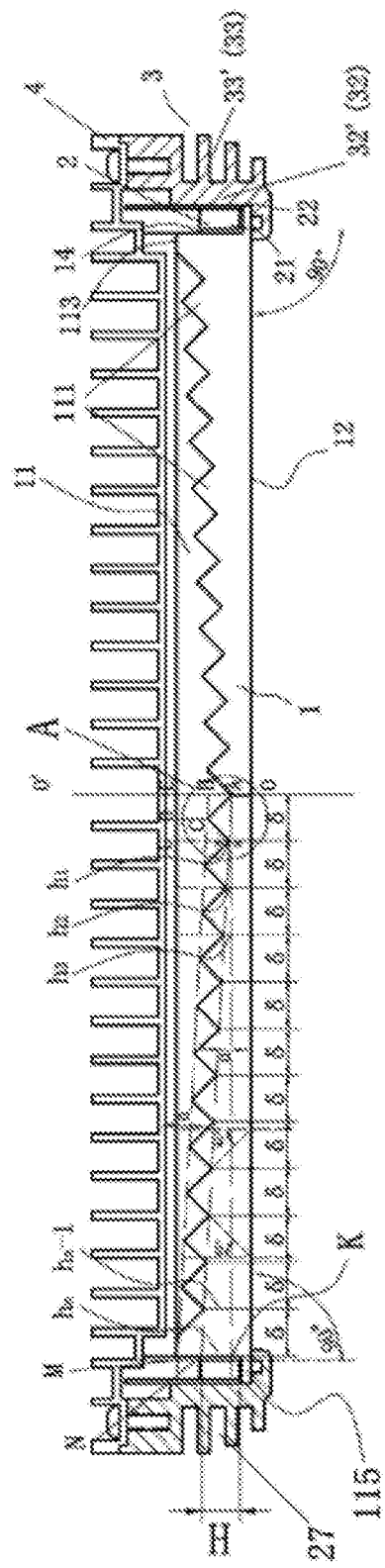
FIG. 8 is the sectional view of the circular plate lamp made of the circular light guide plate of FIG. 7.
Figure 9:
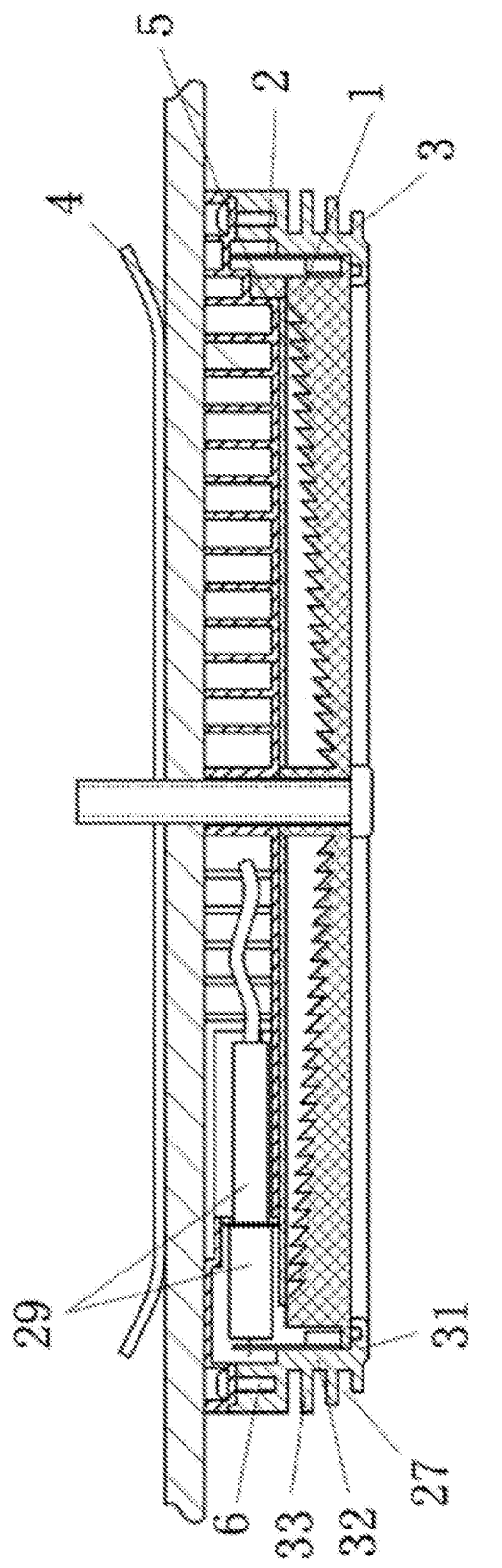
FIG. 9 is the sectional view of circular plate lamp fixture made of the circular plate lamp and used as ceiling lamp.
Figure 10:
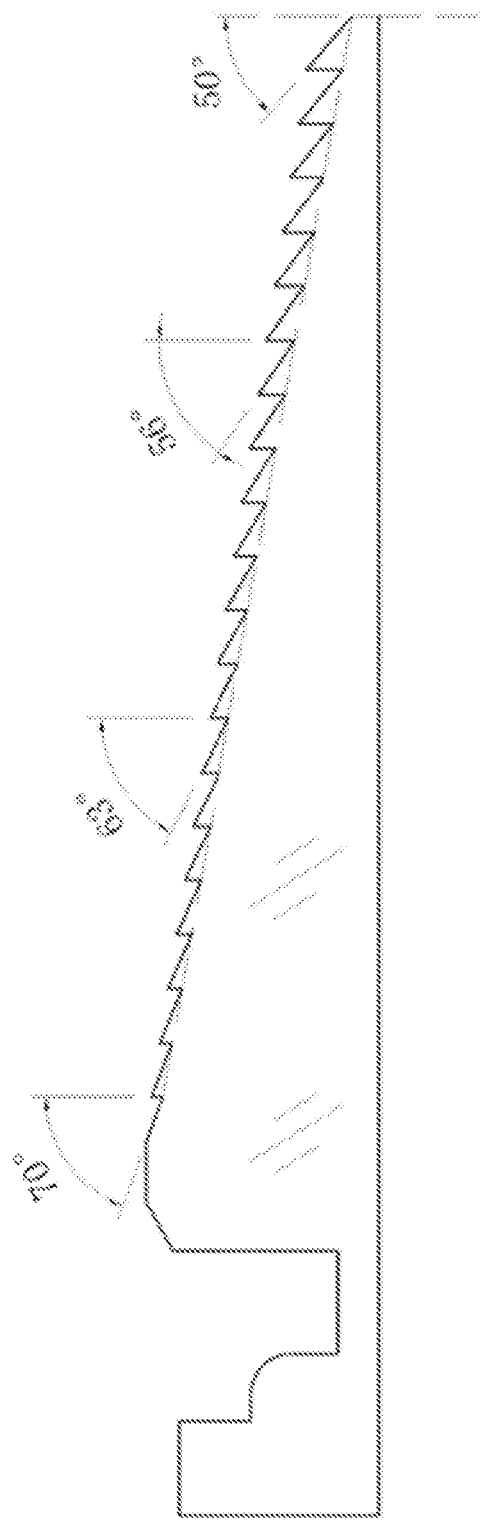
FIG. 10 is the sectional view of the light guide plate with triangular micro prisms having variable-angle critical edges.

FIG. 10 is a sectional view of a preferred embodiment of the asymmetrically arranged light guide plate with triangular micro prism having variable angle critical edge. n prisms are arranged on the prism surface of the light guide plate and are divided into m groups. The angle of the critical edge of the micro prism bodies in each group increases gradually by steps from the micro prism body where the vertex of the triangle is nearest to the smooth surface to the micro prism body where the vertex of the triangle is farthest to the smooth surface, wherein m is greater than and equal to 3. For example, suppose the critical angle of the micro prism body where the vertex of the triangle is the nearest to the smooth surface is x and that of the micro prism body where the vertex of the triangle is the farthest to the smooth surface is y, then the difference of the critical angle of the two adjacent prism assemblies is (y−x)/m.

In an embodiment shown in FIG. 10, a plurality of prisms on the prism surface of the light guide plate is divided into 4 groups. Starting from the micro prism body having the nearest distance from the vertex of the triangle to the smooth surface to that having the longest distance therefrom, the critical angle of the first group of prisms is 63 degrees, that of the second group 56 degrees, that of the third group 63 degrees and that of the fourth group 70 degree.

Those skilled in this art will easily understand that apart from the foregoing step-type change to the critical angle, gradient change can also be used. Suppose n prisms are arranged on the prism surface of the light guide plate, the critical angle of the micro prism body where the vertex of the triangle is the nearest to the smooth surface is x and that of the micro prism body where the vertex of the triangle is the farthest to the smooth surface is y, then the difference of the critical angle of the two adjacent prism assemblies is (y−x)/n.

In addition, another side of the non-critical acceptance edge of the sectional triangle of each micro prism body forms an inclusion angle with the normal line of the smooth surface, ranging from 0 degree to 40 degrees, preferably, 0 degree. When the inclusion angle between the non-critical acceptance edge of the sectional triangle of each micro prism body with the normal line of the smooth surface is 0 degree, a plurality of micro prism bodies can be arranged on the light guide plate having the same length, thus improving the brightness of the lamp fixture.

In addition, although FIG. 10 shows a non-symmetrical shape of variable angle | critical edges triangular prisms of the cross-sectional view of the light guide plate, but the skilled in the art can easily understand, when the cross section of FIG. 10 is arranged symmetrically on the left and right, the cross sections of the symmetrical and circular light guide plates with variable-angle and critical edge triangular prisms can be obtained directly. Therefore, descriptions on symmetrical and circular light guide plate with variable-angle and critical triangular prisms are not repeated herein.

Manufacturing Method of Light Guide Plate with Prisms

The prism light guide plate of the present invention can be made of polycarbonate or poly methyl acrylic aliphatic transparent plastic. The present invention provides a method of manufacturing of the light guide plate with prisms by poly methyl methacrylate (PMMA). Prisms are made by filling the methyl methacrylate (MMA) into the mold of the prisms.

PMMA organic glass is widely used for many products due to its ideal transmittance. The applicant found in practice that PMMA has its limitations. For example, after PMMA injection molding, irregular deformation will happen to the optical structure in the circle center in case of circular light guide plate, resulting in partially raised structure and thus changing the trajectory of the beam in the light guide plate and further changing the optical path of the entire optical element. Therefore, using injection molding method to produce light guide plate with prisms is against the design requirements.

The present invention provides a method to cast the raw materials to make the light guide plate with PMMA prisms without deformation or with limited deformation, so as to obtain the light guide plate with prisms complying with the optical design requirements and to ensure uniform lighting or ideal light distribution by the light guide plate so produced.

This casting method for PMMA light guide plate include the following processes:

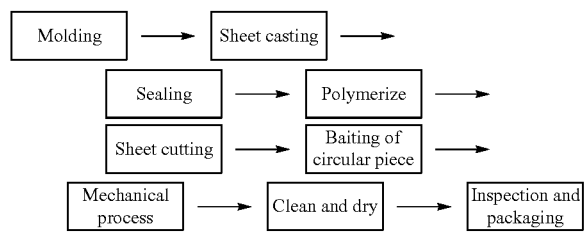

First, perform the polymerization process. Make slurry containing methyl methacrylate at 500 C and continuously stir it for 30 hours to form a prepolymerized slurry. The specific formulations for the slurry are: 98.9% methyl methacrylate, 0.5% stearic, 0.15% methacryloyl, 0.2% ethylene glycol dimethacrylate and 0.25% azobisisobutyronitrile.

Then, pour the prepolymerized slurry into the plywood of the prism molds and seal it to polymerize. Put the said plywood mold into 80☐ water and keep it for 20 hours. Put the said polymerized mold into 105☐ steam room and keep it for 1 hour. Cool the mold evenly to room temperature before opening the mold. At this time, methyl methacrylate slurry is polymerized into polymethyl methacrylate sheet. Open the plywood of the mold and take out the sheet and cut it to form the prisms as required. Then, perform mechanical processing, cleaning, drying and packaging to the cut light guide plate with prisms.

Figure 11:
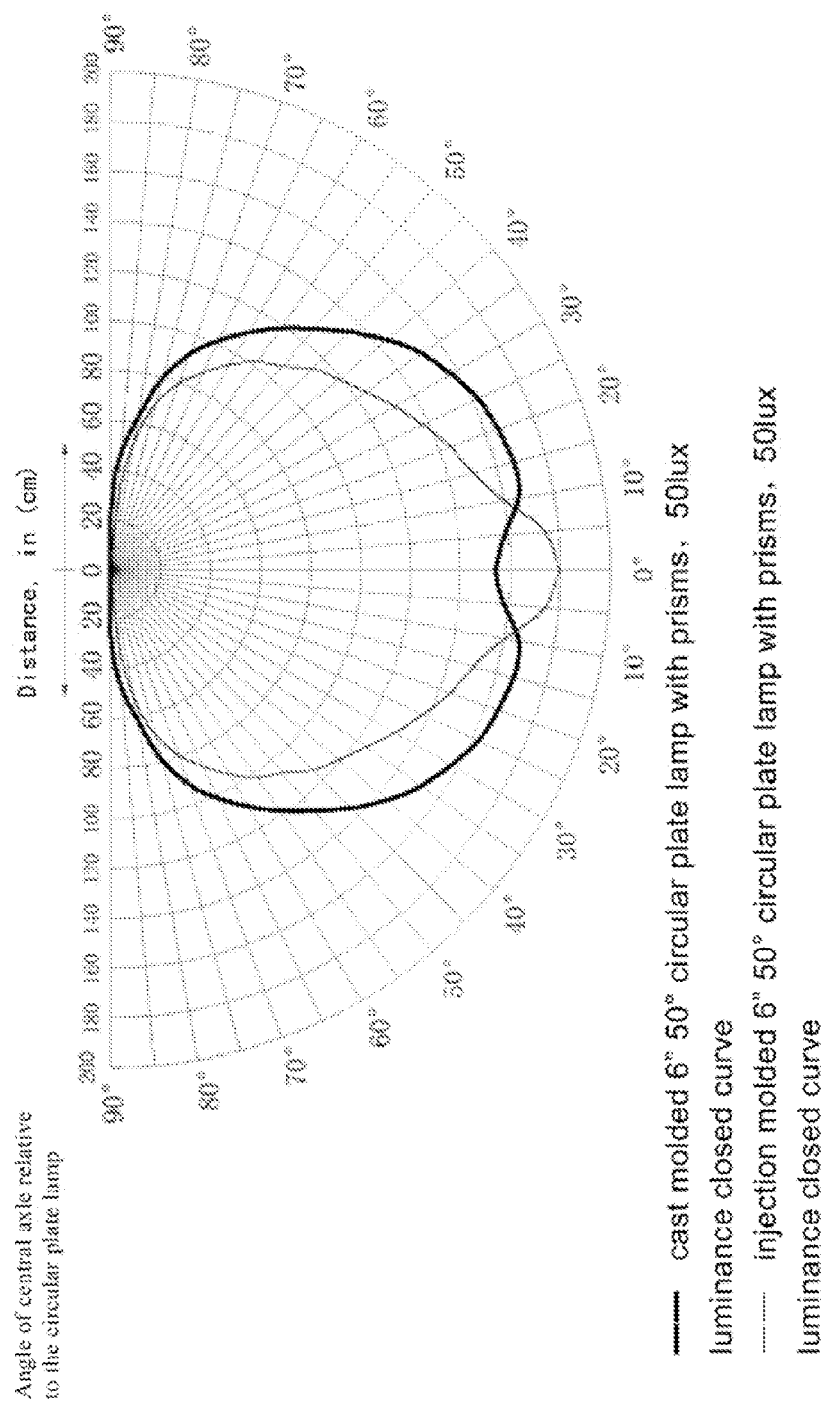
FIG. 11 is the comparative curve graph of the brightness uniformity of the circular plate lamp made by pouring and injection process, respectively.

FIG. 11 shows a comparative curve graph of the uniformity of the luminance of the circular plate lamp made of light guide plate by casting process and injection process, respectively, wherein circular light guide plate with 6" diameter and 500 critical angle is used. The 50Lux closed curve of the circular plate lamp made of light guide plate by casting process shows an apple-shaped distribution, while that by injection process shows a pear-shaped distribution. For example, the 50Lux luminance curve of the circular plate lamp by casting process can reach over 120 cm at 400 of the central axle of the circular plate lamp, but that by injection process can only reach about 100 cm. Obviously, the circular plate lamp made of light guide plate by casting process can ensure satisfactory uniform lighting.

The foregoing includes various embodiments of this invention. It is impossible to describe each component or method or combination thereof of this invention, but those skilled in this field can understand the possibility of more permutations and combinations of the present invention. Therefore, this invention intends to include all the changes, modifications and alterations attached to the appended claims.

The invention claimed is:

1. An asymmetrically arranged light guide plate with triangular micro prisms, characterized in that it comprises:
a smooth surface, and a prism surface,
wherein a plurality of parallel strip-like micro prism bodies are arranged on the said prism surface, the cross section of each micro prism body is triangular, the distance of the vertexes of all triangles from left to right or from right to left to the said smooth surface is gradually increased and the connection line of the vertexes thereof is a straight line, and said straight line forms an inclusion angle α less than 45 degrees with the said smooth surface, a belt-shape light source is arranged on the micro prism body where the vertex of the triangle is the outermost from said smooth surface, the sectional triangles of the micro prism bodies are far from the belt-shape light source and the side receiving the light emitted from the said belt shape light source is called critical acceptance edge, said critical acceptance edge forms a critical angle ranging from 40 degrees to 90 degrees with the normal line of the said smooth surface, and said critical angle is gradually increased from the micro prism body where the vertex of the triangle is nearest to the said smooth surface to the micro prism body where the vertex of the triangle is farthest to the said smooth surface.

2. A symmetrically arranged light guide plate with triangular micro prisms, characterized in that it comprises a smooth surface and a prism surface, wherein a plurality of parallel strip-like micro prism bodies are symmetrically arranged on the said prism surface, having triangular cross section for each said micro prism body, the distance from the vertexes of the triangles on the left and right sides of the symmetrical center to the said smooth surface is increased gradually, the connection line of the vertexes of the triangles is a straight line, said straight line forms inclusion angles all less than 45 degrees with said smooth surface, two belt shape light sources are arranged on the two micro prism bodies where the vertex of the triangle is the farthest from said smooth surface, the side of the sectional triangle for each micro prism body far away from the said belt shape light source and receiving the light emitted from the belt shape light source is called critical acceptance edge, and said critical acceptance edge forms a critical angle with the normal line of the said smooth surface, ranging from 40 degrees to 90 degrees and gradually increased from the symmetrical center to the left and right sides of the said micro prism body.

3. A circular light guide plate with triangular micro prisms, characterized in that it comprises:
a smooth surface and a prism surface,
wherein a plurality of concentric ring-shaped micro prism bodies are arranged in the radial direction starting from the central axle of said prism surface, the cross section of each ring shaped micro prism body via the central axle is triangular, the distance from the vertexes of the sectional triangle of the ring shaped micro prism body arranged on the left and right sides toward the central axle to the smooth surface is gradually increased, the radial connection lines of the vertexes of the sectional triangles of each ring shaped micro prism body are two inclined straight lines, said straight line forms an inclusion angle less than 45 degree with the said smooth surface, a circular belt-shape light source is arranged on the micro prism body where the vertex of the triangle is the outermost from the said smooth surface, the side of the sectional triangle of each ring shaped micro prism body far away from said belt shaped light source and receiving the light emitted from the said belt shape light source is called critical acceptance edge, said critical acceptance edge forms a critical angle ranging from 40 degrees to 90 degrees with the normal line of the said smooth surface, and said critical angle is gradually increased from the central axle to the left and right sides of said circular prism body.

4. The light guide plate of claim 1, characterized in that another side relative to the critical acceptance edge of the sectional triangle of each micro prism body forms an inclusion angle with the normal line of the said smooth surface, ranging from 0 degree to 40 degrees.

5. The light guide plate of claim 1, characterized in that another side relative to the critical acceptance edge of the sectional triangle of each micro prism body forms an inclusion angle of 0 degree with the said smooth surface.

6. The light guide plate of claim 1, characterized in that said prism surface has n prisms, wherein said n prisms are divided into m groups, and said critical angle of the said micro prism body is gradually increased by steps, wherein m is greater than or equal to 3.

7. The light guide plate of claim 1, characterized in that said straight line forms an inclusion angle $\alpha$ less than 10 degrees with the said smooth surface.

8. The light guide plate of claim 1, characterized in that strip-like flanges are arranged on the micro prism body where the vertex of the triangle is farthest from the smooth surface so as to accommodate the lamp groove of the said belt shaped light source.

9. The light guide plate of claim 1, characterized in that the distances of all the sectional triangles are equal in the lengthwise direction and said lengthwise direction is parallel to said smooth surface.

10. The light guide plate of claim 1, characterized in that said light guide plate is made of transparent plastics of polycarbonate or polymethacrylate.

11. A plate-shape lamp, characterized in that it comprises:
the light guide plate of claim 1, wherein strip-like flanges are arranged on the micro prism bodies where the vertex of the triangle is farthest to the smooth surface so as to form the lamp groove accommodating said belt shape light source and the belt shape light source mounted therein.

12. The plate-shape lamp of claim 11, characterized in that said belt shape light source is a prefabricated strip-like lamp assembly comprising a plurality of SMD LEDs and circuit boards, and the emitting plane of said belt shape light source keeps close to the internal wall of said lamp groove and parallel to the smooth surface of said light guide plate.

13. The plate-shape lamp of claim 12, characterized in that the LED in said SMD LEDs is low power tube and a plurality of LEDs can be arranged in one SMD LED.

14. The plate-shape lamp of claim 11, characterized in that it further comprises:
heat dissipating strips, which are installed in the same lamp groove of said belt shape light source to fasten said belt shape light source and absorb the heat emitted from said belt shape light source.

15. The plate-shape lamp of claim 11, characterized in that it further comprises:
a reflective lining mounted on said light guide plate and the reflective plane of said reflective lining stands opposite to the prism surface of said light guide plate.

16. The plate-shape lamp of claim 15, characterized in that said reflective lining is made of plastics, paper or metal materials.

17. A light fixture, characterized in that it comprises:
A plate-shape lamp of claim 11,
A bottom frame accommodating the said plate-shape lamp, and
Constant current source of the belt-shape light source, wherein said constant current source of the belt-shape light source is mounted on the bottom frame and the output terminal thereof is connected with said belt shape light source via conductors.

18. A method for manufacturing the light guide plate with prisms of claim 1, characterized in that it comprises:
pouring the pre-polymerized slurry containing methyl methacrylate into the laminates of the prism mold having shapes corresponding to a plurality of light guide plates with micro prisms,
polymerizing the methyl methacrylate slurry into polymethyl methacrylate sheet, opening the laminate of the mold and removing the polymethyl methacrylate sheet, and cutting the polymethyl methacrylate sheet to form micro prisms at predetermined size.

\* \* \* \* \*